United States Patent Office 2,963,374
Patented Dec. 6, 1960

2,963,374

PROCESS FOR SUPPRESSING FOOD SPOILAGE AND COMPOSITION THEREFOR

Robert G. Sanders, Pompton Lakes, N.J., assignor to Warner-Lambert Pharmaceutical Company, Morris Plains, N.J., a corporation of Delaware No Drawing. Filed Nov. 25, 1957, Ser. No. 698,374

7 Claims. (Cl. 99—150)

This invention relates to improved food compositions and relates more particularly to a new and novel process for the treatment of foods in order to preserve said foods and to prevent spoilage due to the growth of microorganisms.

An object of this invention is the preparation of modified foods and food compositions which are resistant to the growth of bacteria and other microorganisms and which may be maintained in edible condition for prolonged periods of time.

Another object is to provide a process for the preservation of foods and food compositions by the treatment of said foods and food compositions with certain 5-amino-hexahydro-pyrimidine compounds.

Other objects of this invention will appear from the following detailed description.

The techniques of food preservation are designed not only to extend the storage life of the treated food to the greatest possible degree but also to maintain unchanged the nutritional values of the food. Some foods may be preserved satisfactorily by mere drying followed by storage at ordinary temperatures under conditions where excessive moisture can be avoided. Other foods, such as fresh meats and fish find only a limited acceptability in the market in any form other than in their original and unaltered form. The preservation of such foods requires careful refrigeration but without actual freezing; refrigeration alone can only be relied upon for a limited time before some undesirable changes occur due to the growth of microorganisms on these fresh foods.

It has now been found that the storage life of foods, including fresh meats and fish, may be greatly enhanced alone or in combination with other food preservation methods if the foods are treated with a 5-amino-hexahydro-pyrimidine of the following formula:

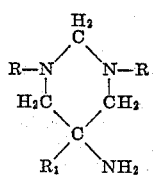

wherein R is an alkyl, aryl, aralkyl, alkaryl, hydroxyalkyl, aminoalkyl or cycloalkyl radical and $R_1$ represents hydrogen or a lower alkyl or hydroxymethyl radical, or with a salt of said 5-amino-hexahydro-pyrimidine compound. The foods so treated are markedly resistant to supporting the growth of microorganisms and are able to undergo the usual forms of storage for periods of time substantially in excess of those experienced when the stored foods are placed in storage in an untreated form. Undesirable changes in taste, form and appearance due to bacterial action are greatly minimized.

In applying the 5-amino-hexahydro-pyrimidines to foods for enhancing their resistance to the growth of microorganisms, the compounds may be applied in the form of an aqueous solution or dispersion during various stages of processing. Where the meat is stored in carcass form, the carcasses may be bathed in or sprayed with a solution of the 5-amino-hexahydro-pyrimidine. Also, when marked in family-sized package form, the individual cuts may be treated in the same way prior to packaging. Satisfactory results are obtained employing a solution of the 5-amino-hexahydro-pyrimidine containing up to about 1.0% by weight.

It is preferred that not more than about 0.1% by weight of the 5-amino-hexahydro-pyrimidine be placed on the food being treated and less than that amount, for example, as low as 0.01% or even less is satisfactory. These 5-amino-hexahydropyrimidines have a rather low toxicity, both acute and chronic, and can be tolerated in appreciable amounts. For example, $LD_{50}$ (a standard statistical value which corresponds to the single dose which is lethal to 50% of the test animals) for the compound 1,3-bis(beta-ethylhexyl) - 5 - methyl-5-amino-hexahydro-pyrimidine is 1630 mg./kg. orally in rats and 142 mg./kg. intraperitoneally in mice. The maximum daily tolerated dose of this exemplary pyrimidine compound in the rats is 75–100 mg./kg. Three groups of twenty rats each were given 0.02%, 0.05% and 0.1% by weight of 1,3-bis(beta-ethylhexyl) - 5 - methyl-5-amino-hexahydropyrimidine in their diet for a period of forty-eight weeks. No mortalities were observed in any of the three groups. Histopathology of these animals at six months showed no pathological lesions attributed to 1,3-bis(beta-ethylhexyl)-5-methyl-5-amino-hexahydropyrimidine.

Fresh fish in whole or in fillet form may be similarly treated with excellent results. The perishability of fish or other sea food in transit is ordinarily avoided by icing the fish to maintain the temperature below that at which bacterial growth or multiplication is favored. Advantageously, the ice employed for this purpose may be prepared by freezing an aqueous solution containing up to about 0.1% by weight of the desired 5-amino-hexahydro-pyrimidine and employing the ice so formed for icing purposes. The 5-amino-hexahydro-pyrimidines exhibit a pronounced affinity for protein materials and subsequent icings need only be conducted with ordinary forms of ice. No impairment in the degree of protection obtained is observed where ordinary ice is employed to supplement the original icing.

Poultry either in the form of whole birds or in parts may be similarly treated with highly advantageous results and with a substantial increase in the shelf life of the poultry so treated. The residual 5-amino-hexahydro-pyrimidine should be adjusted, however, so that it is no greater than about 5 milligrams per pound of the meat, fish or poultry so treated. Quantities in the range of 0.1 to 2 milligrams per pound are quite satisfactory.

Mold growth on citrus fruits, such as oranges, lemons and grapefruit may also be controlled by the application thereto of said 5-amino-hexahydro-pyrimidines.

The pyrimidine compounds employed in the novel process of this invention, as indicated above, have the formula:

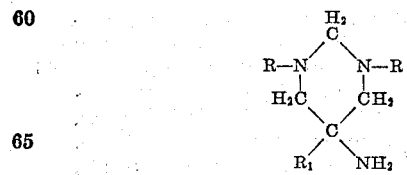

wherein R is an alkyl, aryl, aralkyl, alkaryl, hydroxyalkyl, aminoalkyl or cycloalkyl radical and $R_1$ is hydrogen, or a lower alkyl or hydroxymethyl radical. These compounds may be prepared by the method described in U.S. Patent 2,387,043. Among the 5-amino-hexahydropyrimidine compounds which have been found effective may be mentioned 1,3-bismethyl-5-methyl-5-amino-hexahydropyrimidine,
1,3-bis(beta-ethylhexyl) - 5 - methyl-5-amino-hexahydropyrimidine,
1,3-bispropyl-5-methyl-5-amino-hexahydropyrimidine,
1,3-bis(isopropyl) - 5 - methyl-5-amino-hexahydropyrimidine,
1,3-bisbutyl-5-methyl-5-amino-hexahydropyrimidine,
1,3-bis(secondary butyl)-5-methyl-5-amino-hexahydropyrimidine,
1,3-bis(tertiary butyl)-5-methyl-5-amino-hexahydropyrimidine,
1,3-bishexyl-5-methyl-5-amino-hexahydropyrimidine,
1,3-bisheptyl-5-methyl-5-amino-hexahydropyrimidine,
1,3-bisoctyl-5-methyl-5-amino-hexahydropyrimidine,
1,3-bisdecyl-5-methyl-5-amino-hexahydropyrimidine,
1,3-bisdodecyl-5-methyl-5-amino-hexahydropyrimidine,
1,3-bistetradecyl-5-methyl-5-amino-hexahydropyrimidine,
1,3-bishexadecyl-5-methyl-5-amino-hexahydropyrimidine,
1,3-bis(1-methylheptyl) - 5 - methyl-5-amino-hexahydropyrimidine,
1,3-bis(1,3-dimethylbutyl) - 5 - methyl-5-amino-hexahydropyrimidine,
1,3 - bis(tertiary butyl-2-methyl)-5-methyl-5-amino-hexahydropyrimidine,
1,3-bis(isopropyl-2-methyl) - 5 - methyl-5-amino-hexahydropyrimidine,
1,3-bis(hydroxy tertiary butyl)-5-methyl-5-amino-hexahydropyrimidine,
1,3-bis(isopropyl) - 5 - hydroxymethyl-5-amino-hexahydropyrimidine,
1,3 - bis(β-hydroxyethylaminopropyl)-5-methyl-5-amino-hexahydropyrimidine,
1,3 - bis(1,1-dimethyl-2-hydroxyethyl)-5-methyl-5-amino-hexahydropyrimidine,
1,3 - bis(butylaminopropyl)-5-methyl-5-amino-hexahydropyrimidine,
1,3-bis(beta-ethylhexyl)-5-amino-hexahydropyrimidine,
1,3 - bis(beta-ethylhexyl) - 5 - hydroxy-methyl-5-amino-hexahydropyrimidine,
1,3 - bis(cyclohexyl)-5-methyl-5-amino-hexahydropyrimidine,
1,3-bis(dicyclohexyl) - 5 - methyl-5-amino-hexahydropyrimidine,
1,3-bistolyl-5-methyl-5-amino-hexahydropyrimidine,
1,3-bisbenzyl-5-methyl-5-amino-hexahydropyrimidine,
1,3-bis(methylbenzyl) - 5 - methyl-5-amino-hexahydropyrimidine,
1,3-bisphenyl-5-methyl-5-amino-hexahydropyrimidine,
1,3-bis(phenylethyl) - 5 - methyl-5-amino-hexahydropyrimidine,
1,3-bis(beta-ethylhexyl) - 5 - ethyl-5-amino-hexahydropyrimidine,
1,3-bis-dodecyl-5-ethyl-5-amino-hexahydropyrimidine,
1,3 - bis(hydroxy tertiary butyl)-5-ethyl-5-amino-hexahydropyrimidine,
1,3 - bis(beta-ethylhexyl)-5-propyl-5-amino-hexahydropyrimidine, and
1,3-bis(beta-ethylhexyl) - 5 - butyl-5-amino-hexahydropyrimidine.

It will be understood that other 5-amino-hexahydropyrimidine compounds of the above-noted classes are also suitable for use in the compositions of the invention.

As stated above, in lieu of employing the 5-amino-hexahydropyrimidines above in the form of their free bases, the salts of these amine compounds may also be utilized. Salts are readily formed with acids such as, for example, acetic acid, phosphoric acid, hydrochloric acid, maleic acid, benzoic acid, citric acid, malic acid, oxalic acid, tartaric acid, succinic acid, glutaric acid, gentisic acid, valeric acid, gallic acid, β-resorcylic acid, acetyl salicylic acid and salicylic acid, as well as perchloric acid, barbituric acid, sulfanilic acid, phytic acid and p-nitro benzoic acid. These amines also form useful salts with long chain aliphatic acids, such as stearic acid, palmitic acid, oleic acid, myristic acid, and lauric acid. The trihydrochloride, for example, is highly water soluble.

In addition to incorporating said 5-amino-hexahydropyrimidines in solutions for the treatment of said raw foods, as described, it is of great value to employ said compounds in the preparation of packaging materials such as the paper and parchment type of wrapping materials employed in packaging meat, fish, poultry and similar raw foods. These compounds may also be incorporated in the waxes and similar paper coating compositions which are applied to packaging papers and which are designed to impart greater water resistance to these materials. They may also be incorporated into polyethylene and polyvinylidene chloride materials as well as into the usual cellophane coating compositions.

In order further to illustrate this invention the following examples are given:

*Example I*

A preservative bath of the following compositions is prepared:

Parts by weight
1,3-bis(beta-ethylhexyl) - 5 - methyl-5-amino-hexahydropyrimidine _____ 0.1
Polyoxyethylene sorbitan mono-oleate (Tween 80) __ 1.4
Water, q.s. to 1000.0.

Freshly prepared fish fillets are immersed in this bath for two minutes and then iced for shipment. This treatment is found to extend the shipping range materially and to reduce the frequency of re-icing in transit while maintaining the appearance and acceptability unchanged.

This bath is also excellent for the treatment of dressed poultry prior to packaging and for the treatment of meats in carcass form.

*Example II*

A 0.005% aqueous solution of 1,3-bis(beta-ethylhexyl)-5-methyl-5-amino-hexahydro-pyrimidine trihydrochloride is frozen into the form of flake ice and used for the icing of fresh shrimp in transit. This treatment effectively controls bacterial action and maintains the product in acceptable market condition not only in transit but subsequently with only a minimum of re-icing.

*Example III*

A dip having the composition of that in Example I is prepared but 0.2 part by weight of 1,3-bis(ethylhexyl)-5-methyl - 5 - amino-hexahydro-pyrimidine trihydrochloride are employed in lieu of the free base. This dip is employed for the treatment of fresh oranges and gives a satisfactory control of undesirable mold growth.

It is understood that the foregoing detailed description is given merely by way of illustration and that many variations may be made therein without departing from the spirit of my invention.

Having described my invention, what I desire to secure by Letters Patent is:

1. Process for suppressing food spoilage, which comprises applying to said foods not more than 0.1 percent by weight of a compound of the group consisting of those having the formula:

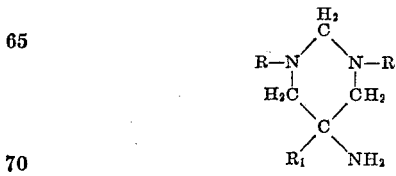

wherein R represents a radical selected from the group consisting of alkyl, aryl, aralkyl, alkaryl, hydroxy-alkyl, aminoalkyl, and cycloalkyl and $R_1$ is selected from the group consisting of hydrogen, lower alkyl and hydroxymethyl radicals and the salts of said compounds, 2. Process for suppressing food spoilage, which comprises immersing said food in and then removing said foods from an aqueous dispersion comprising not more than 1.0 percent by weight of a compound of the group consisting of those having the formula:

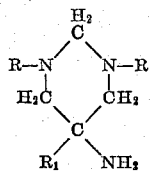

wherein R represents a radical selected from the group consisting of alkyl, aryl, aralkyl, alkaryl, hydroxy-alkyl, aminoalkyl, and cycloalkyl and $R_1$ is selected from the group consisting of hydrogen, lower alkyl and hydroxymethyl radicals and the salts of said compounds.

3. Process for suppressing food spoilage on foods requiring refrigeration, which comprises icing said foods with ice formed by freezing an aqueous solution comprising not more than 0.1 percent by weight of a compound of the group consisting of those having the formula:

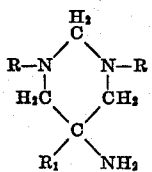

wherein R represents a radical selected from the group consisting of alkyl, aryl, aralkyl, alkaryl, hydroxy-alkyl, aminoalkyl, and cycloalkyl and $R_1$ is selected from the group consisting of hydrogen, lower alkyl and hydroxymethyl radicals and the salts of said compounds.

4. Process for suppressing food spoilage which comprises applying to said foods not more than 0.1 percent by weight of a compound of the group consisting of 1,3 - bis(beta-ethylhexyl) - 5 - methyl - 5 - amino - hexahydro-pyrimidine and the salts of said compound.

5. Process for suppressing food spoilage, which comprises dipping said foods in an aqueous medium containing not more than 1.0 percent by weight of a member of the group consisting of 1,3-bis(beta-ethylhexyl)-5-methyl - 5 - amino-hexahydropyrimidine, and the salts thereof.

6. An icing composition for suppressing food spoilage comprising a frozen aqueous medium containing not more than 0.1 percent by weight of a member of the group consisting of 1,3-bis(beta-ethylhexyl)-5-methyl-5-amino-hexahydro-pyrimidine and the salts thereof.

7. An icing composition for suppressing food spoilage comprising a frozen aqueous medium containing a dispersing agent and not more than 0.1 percent by weight of a member of the group consisting of 1,3-bis(beta-ethylhexyl)-5-methyl-5-amino-hexahydro-pyrimidine and the salts thereof.

References Cited in the file of this patent

UNITED STATES PATENTS

| | | |
|---|---|---|
| 2,387,043 | Senkus | Oct. 16, 1945 |
| 2,398,781 | Frandsen | Apr. 23, 1946 |
| 2,415,047 | Senkus | Jan. 28, 1947 |
| 2,509,579 | Sharma | May 30, 1950 |
| 2,521,358 | Galvin | Sept. 5, 1950 |
| 2,755,191 | Schmitz | July 17, 1956 |
| 2,766,124 | Upham et al. | Oct. 9, 1956 |